Feb. 23, 1926. Re. 16,276

S. C. CARY

METHOD OF WELDING

Original Filed April 6, 1916 2 Sheets-Sheet 1

INVENTOR,
SPENCER C. CARY,
BY
H. S. Bernhard
ATTORNEY.

Feb. 23, 1926. Re. 16,276

S. C. CARY

METHOD OF WELDING

Original Filed April 6, 1916 2 Sheets-Sheet 2

PROPRIETOR.
SPENCER C. CARY,
BY
H. J. Bernberg
ATTORNEY

Reissued Feb. 23, 1926. Re. 16,276

UNITED STATES PATENT OFFICE.

SPENCER C. CARY, OF BROOKLYN, NEW YORK, ASSIGNOR TO CARY MANUFACTURING CO., OF BROOKLYN, NEW YORK, A CORPORATION OF NEW YORK.

METHOD OF WELDING.

Original No. 1,326,912, dated January 6, 1920, Serial No. 89,289, filed April 6, 1916. Application for reissue filed October 27, 1920. Serial No. 420,019.

*To all whom it may concern:*

Be it known that I, SPENCER C. CARY, a citizen of the United States, residing at the city of New York, borough of Brooklyn, county of Kings, and State of New York, have invented a certain new and useful Method of Welding, of which the following is a specification.

This invention is a method of welding, the same being useful in the union of thin sheet iron in the condition in which said sheets are to be obtained in the market; and it pertains, more particularly, to the production of narrow continuous bands, the same being preferably treated to render said bands non-oxidizable under climatic conditions or atmospheric changes.

The narrow continuous band produced by my invention is suitable for various purposes, such as in strapping boxes, barrels, shooks, and other packages, but it is not desired to restrict the invention to the manufacture of box strapping, for the reason that said invention, in a broad aspect, may be employed generally for welding sheet metal, said welded sheets being adapted for various industrial purposes, such as in the manufacture of sheet metal hoops, or the like.

The objects of the invention are, first, to obtain a rigid perfect union between the marginal portions of the assembled metal sheets, to the end that the metal at the welds will be equal substantially to the thickness or gage of the sheets, the strength of the weld being equal to the strength of the sheets, and may, in fact, exceed the strength of the sheets; second, to perform the various operations quickly and accurately so as to obtain marked economy of manufacture.

Experiments extending through many years have shown conclusively that thin rolled sheet iron in the condition in which it exists when sold in the open market cannot be successively welded, for the reason that the surface of the sheet becomes oxidized by exposure to the atmosphere, and upon heating the marginal portion of the sheets prior to or during the welding operation, the surface oxidization or scale becomes loosened and flakes off. The presence of the metallic scale or flakes in the joint impairs to a serious extent the weld between the marginal portions of the sheets, and in fact precludes the welding together of said sheets because the weld is so imperfect and insecure that the sheets separate of their own accord. Numerous attempts have been made to overcome this difficulty, among them being the operation known as "pickling" the sheet metal, but obviously the use of the pickling bath requires time, care and labor, so that it is not economical to such an extent as to commend it to the metal working trade, and, furthermore, the exposure of the pickled sheets to the atmosphere during transit betwen the rolling mill and the locality at which the sheets are to be utilized results in the undesirable oxidization so that, as a general result, the metal will scale or flake when welded.

I have discovered and invented a mode of procedure whereby the thin rolled metal sheets of commerce are perfectly welded at the marginal portions thereof. To this end, the sheets to be welded are subjected to such treatment at their marginal portions as to eliminate the oxidization and to preclude the formation of scale during the welding operation. In my preferred mode of procedure, the scale or surface oxidization is removed by sand blasting both sides of the edges of the sheets, lapping the edges of the two sheets, pressing the lapped edges, and passing a current through the sand blasted portions of the sheets to continuously weld the lapped portions.

The invention consists, further, in a process of welding sheets to form a continuous band, consisting in sand blasting both sides of the edges of the sheets, lapping the edges of the two sheets, pressing the lapped edges, and passing a current through the sand blasted portions of the sheets to continuously weld the lapped edges, and cutting the welded sheets into narrow strips.

The invention consists, further, in positioning the marginal portions of a sheet or sheets in lapping relation, subjecting said lapping margins to electrical heat for rendering the metal plastic or substantially so and concurrently with the heating of said marginal portions, the metal softened by heat is pressed by the action of a traversing roll the pressure so applied serving to form the weld and reducing the thickness of said weld to substantially the thickness (gage) of the sheet.

Other features and advantages of the invention will appear from the following detailed description taken in connection with the drawings, wherein—

In the accompanying drawings I have illustrated, and will hereafter describe, my invention as adapted for the production of narrow coated bands or strips of sheet metal, but it is to be distinctly understood that parts of the invention may be used without the whole so that in a broad aspect the invention pertains to the process of welding and, more particularly, to welding sheet metal.

Figure 1:
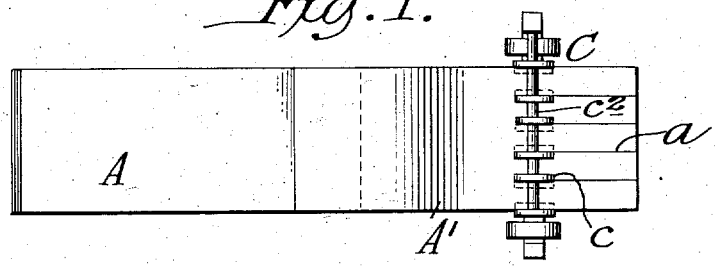
Figure 1 is a plan view illustrating the operation of cutting the disconnected or separated sheets into lengths of predetermined width.
Figure 2:
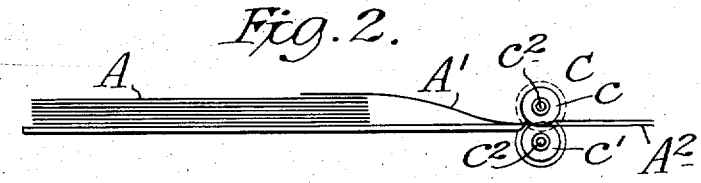
Figure 2 is a side elevation of the means and material illustrated in Figure 1.
Figure 3:
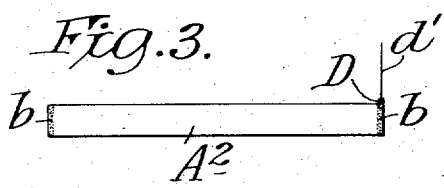
Figure 3 is a plan view illustrating the the operation of removing the surface oxidization from a cut length of metal in order to prepare the latter for the welding operation.

As is well known to those skilled in the art, sheet metal is ordinarily rolled, either by the hot rolling process or by a cold rolling process, and said sheets are stacked or piled one upon the other and tied by one form of means or another into an elongated bundle. Such a bundle of sheets as delivered by the rolling mill is indicated at A, in Figures 1 and 2. The bundle of sheets is placed upon a suitable table B, and said sheets are delivered in any suitable way and by any suitable means to a cutting mechanism C. The sheets are fed individually, as at A′ in Figures 1 and 2 to said cutting mechanism C, the cutters of which are positioned to trim the longitudinal side edges of each sheet and to sever said sheet longitudinally on predetermined lines indicated at *a*, whereby the sheet is cut lengthwise to produce a series of strips $A^2$, each strip being equal in length to the sheet from which it was cut and being uniform in width, and, preferably, the width of one strip is the same as that of the other strips cut from the sheet. The cutting mechanism C is shown as two series of disks *c*, *c′*, each series being mounted on a shaft $c^2$ which is driven by suitable means, but it is evident that any appropriate form of cutting mechanism may be substituted for the one herein shown.

Figure 4:
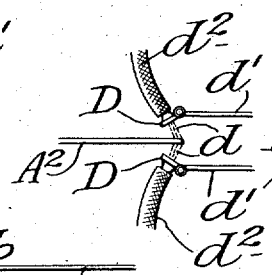
Figure 4 is a side elevation of two nozzles positioned and operating to direct sand blasts against the respective surfaces of a length of sheet metal for the purpose of removing the surface oxidization along the marginal portion of said sheet metal length.

Subsequent to the operation of slitting the commercial sheet into strips as described, each strip is subjected to treatment prior to welding for the purpose of eliminating the surface oxidation along a marginal portion or portions of said strip. While various means may be employed in carrying out the operation of mechanical attrition in order to eliminate the surface oxidation, it is preferred to use a nozzle, or nozzles, for directing a sand blast or sand blasts against the surfaces of the strip $A^2$. As shown more particularly in Figure 4, nozzles D, D′ are positioned to direct blasts of sand, as *d*, against the surfaces of the strip $A^2$, each nozzle being movable by suitable mechanism, as *d′*, so as to direct the sand blast crosswise of the strip and to limit the field or zone of the sand blast to the desired narrow marginal portion *b* of the strip $A^2$. The nozzles D, D′ are positioned above and below the strip $A^2$ so that the sand blasts *d* are directed against the narrow marginal portion *b* of said strip. As shown, each nozzle D or D′ is supplied with sand and a blast of air under suitable pressure through flexible tubes $d^2$, and it is preferred in carrying out this sand blasting operation to retain the strip $A^a$ in a stationary position and to conduct said operation within a closed chamber adapted to collect the sand. The pressure of air is sufficient to direct the sand against the oxidized surface of the metal with such force as to abrade the surface, whereby the blast acts by mechanical attrition to cut away the surface oxidation and to expose the raw or non-oxidized metal at the narrow marginal portion *b*. Although I have described that the nozzles D, D′ are movable and the strip $A^2$ is stationary, yet it is apparent that stationary nozzles may be used and suitable means be provided for imparting movement to the strip $A^2$, thus reversing the conditions of operation, but it will be manifest that either mode of treatment may be utilized for the reason that there should be a relative movement between the material and the sand blast nozzles. When the metal is treated by sand blasting the marginal portions of the sheet or strip, it is not necessary to pickle the metal, whereby the expense of the pickling operation is saved and the sheets or strips are prepared rapidly and economically just prior to the welding operation so as to effect the union of the sheets rapidly and by continuous welds.

Figure 5:
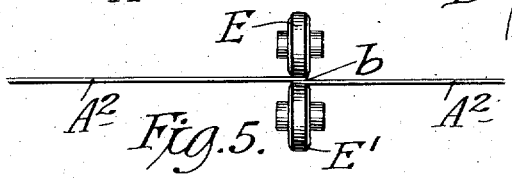
Figure 5 is an elevation illustrating the operation of applying pressure and heat to lapped portions of two pieces of metal in order to weld the same.

The strips $A^2$ are assembled for the sand-blasted marginal portions *b* thereof to be adjacent each other, and in Figure 5 said strips $A^2$ are shown as being positioned in lapping relation along the marginal sand-blasted portions *b* thereof, whereby welding heat and pressure may be applied to the lapped sand-blasted margins of the sheets in order to effect the union of said sheets by continuous welds.

Various means may be employed for simultaneously applying the welding heat and pressure, but it is preferred to employ a pair of cooperating rolls E, E′, and to use means for supplying a welding current to said rolls, whereby the rolls may be operated by imparting a traversing movement thereto in order to effect the union of the sheets along the marginal portions thereof. It will be understood that the rolls E, E′ apply mechanical pressure to the margins of the sheets, and that the electrical current is applied through said rolls in order to heat the margins of the sheet to the point of plasticity, said application of pressure and of the welding current taking place simultaneously, whereby a single traversing movement of the rolls crosswise of the sheets and in contact with the marginal portions thereof effects the union of the sheets by welding them together at one operation. As shown, the two rolls E, E′ are capable of a traversing movement and the welding current is supplied to one roll, passes through the margins of the sheets, and flows into the other roll so as to complete the electric circuit, but I reserve the right of employing any suitable electric welding mechanism to effect the application of heat and pressure simultaneously.

Figure 6:
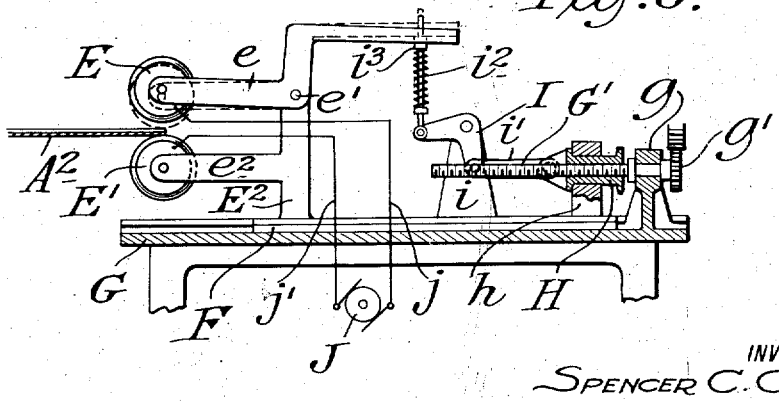
Figure 6 is an elevation partly in section illustrating a preferred means for electrically welding the marginal portions of two pieces of sheet metal.

As shown more particularly in Figure 6, the upper roll E is carried on a vibrating arm *e* pivoted at *e′* to a standard, the latter having an arm $e^2$ on which is journaled the lower roll E′. Said standard is affixed to a sliding bed F moving in a suitable guideway *f* of a table G, whereby the two rolls E, E′ are carried by a single element so as to move simultaneously across the two pieces of metal to be welded. The traversing movement is given to the sliding bed F by a feed screw G′ supported in a suitable bearing *g* and operated by gearing *g′*. Said feed screw rotates in a nut H sleeved on a post *h* of the bed plate F, so that the rotative movement of the feed screw acts upon the nut to impart the traversing movement to the bed and the current-carrying pressure rolls. In the position shown in Figure 6, the roll E is separate from the roll E′, but as the bed plate begins its movement means are provided for actuation by the feed screw in order to press the roll E toward the roll E′ so that the two rolls cooperate to apply the required pressure to the pieces to be welded. The means illustrated for imparting the lateral movement to roll E relatively to roll E′ is a bellcrank I fulcrumed on a post *i* of the table G, and to one arm of this bellcrank is connected a link *i′* operated by the advancing movement of the nut H, whereas to the other arm of the bellcrank is connected a spring cushioned rod $i^2$, the upper end of which is furnished with a collar $i^3$ positioned to contact with the lever *e* which carries the upper roll E.

It is apparent that suitable electrical means are employed for supplying the welding current to the rolls E, E′, and in Figure 6 there is shown diagrammatically the electrical equipment. A generator, as J, feeds current to the mains *j*, *j′* which are electrically connected with the rolls E, E′, respectively, and when the apparatus is used the circuit is closed by bringing the roll E into contact with the metal which rests upon the roll E′, thereby supplying the current required to soften the metal at the lapped margins of the two pieces to be welded.

After the pieces of metal to be welded shall have been sand blasted at *b*, said pieces are positioned adjacent to the rolls E, E′, and with the marginal portion *b* of one piece in lapping relation to the marginal portion *b* of the other piece. The lowermost piece is in electrical contact with the roll E′, but the roll E is mechanically separated from contact with the metal. When power is applied to the feed screw G, the bellcrank I is operated to turn the lever *e* and move the roll E into contact with the metal, thus establishing a flow of current from roll E through the metal to the roll E′, and the feed screw G′ imparts movement through the nut to the sliding bed F so as to move the rolls E, E′ across the pieces to be welded, the direction of said rolls E, E′ being in the plane of the lapped sand-blasted portions of the two pieces $A^2$. As the rolls complete their traversing movement, the roll E is separated from, or elevated with respect to, the roll E′, and the bed F is moved rearwardly so as to withdraw the rolls from the material. The welded strips or sheets are retained in a stationary position by suitable clamping means (not shown) during the welding operation, and thereafter these sheets are fed forward so that the free edge portion of one of the sheets may be welded by the next operation of the mechanism to the corresponding edge portion of another detached sheet.

The weld is continuous across the strips or sheets, and by preparing the marginal portions of the sheets as heretofore described I am enabled to so effectually weld the metal at the margins of the sheets that the sheets are stronger at the welded joints than at other parts thereof. At the same time the application of the welding current softens the margins of the sheet so as to render the same plastic, and the pressure of the rolls displaces the metal in such manner that the weld is rolled to a thickness equal substantially to the thickness (gage) of the sheet, the resulting joint being practically invisible, said weld being characterized by a freedom from irregularities or roughness at the surfaces and the edge portions of the welded sheets. The welding operation is performed not only very effectually and thoroughly, but it is carried out expeditiously for the reason that it is necessary to impart a traversing movement only once to the current-carrying pressure rolls.

Figure 8:
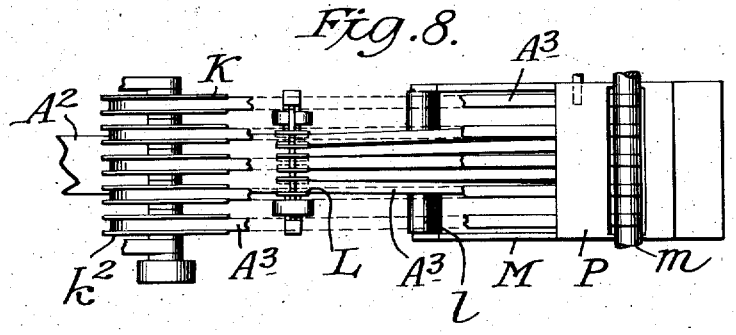
Figure 8 is a plan view illustrating in part means for slitting the welded strips so as to produce a series of narrow bands or strapping, means for separating the narrow bands or strapping, and means for applying simultaneously a nonoxidizable coating to the individual narrow bands or strapping.
Figure 9:
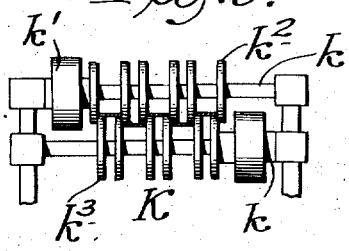
Figure 9 is an elevation of the welded strip slitting mechanism the position of which is illustrated partly in Figure 8.
Figure 7:
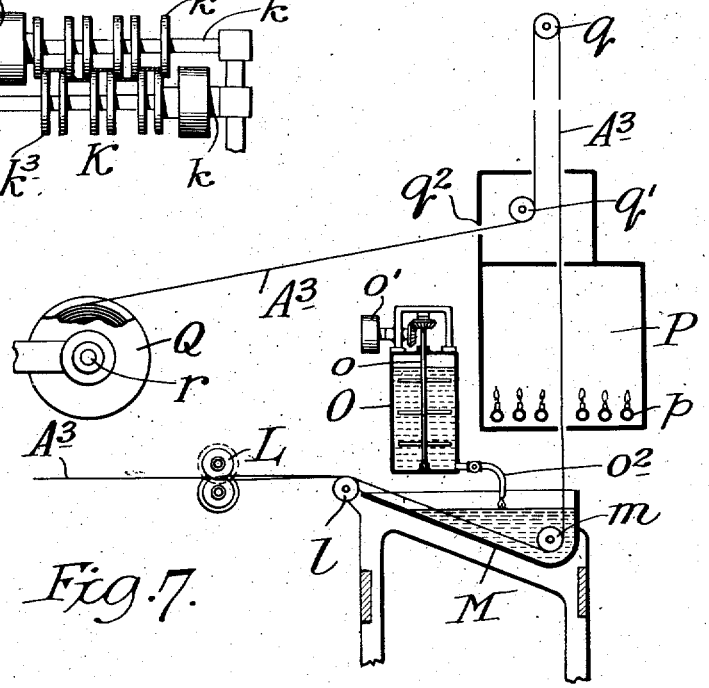
Figure 7 is an elevation partly in section, illustrating means for applying a non-oxidizable coating to a series of narrow bands simultaneously, and for conducting said bands through a drying chamber for the purpose of drying and baking the coating or enamel applied thereto, and illustrating, also, means whereby a series of coated and dried bands are adapted to be wound into compact bundles.

The welded strips or sheets are fed to slitting mechanism K, one form of which is shown in Figures 8 and 9, whereby the welded sheets or strips are cut longitudinally on a plurality of lines so as to produce a series of narrow bands $A^3$. The slitting mechanism is shown in Figure 9 as consisting of shafts $k$ positioned one below the other and each provided with a driving pulley $k'$, the upper shaft having a series of rotary knives $k^2$ which cooperate with similar knives $k^3$ on the lower shaft, whereby the two series of rotating knives operate upon the welded strips or sheets to simultaneously cut therefrom a series of the narrow bands $A^3$.

The manipulation of the metal in accordance with this invention may cease when the bands are slitted from the welded sheets, and thereafter the bands may be wound into compact bundles so as to render the bands suitable for use as box strapping, etc. It is preferred, however, to continue the treatment by applying a non-oxidable coating to the series of bands simultaneously, and to thereafter conduct the bands through a heating chamber in order to dry or bake the enamel coating, the operations of coating and baking said coating on the bands being performed prior to the winding of the bands into distinct bundles. In accordance with this form of the invention, the bands $A^3$ are conducted between suitable separating guides L positioned and operating to separate the bands from each other. All the bands run over a guide roller $l$ of a coating tank M having another guide roller $m$. This tank contains a bath of the coating material which may be in the form of a japanning composition or of an enamel, said composition being stored within a closed tank O, within which operates an agitator $o$, driven by power applied to a belt wheel $o'$, said tank being provided at its lower part with a valved outlet $o^2$ arranged over the tank M so as to supply the coating composition directly thereto. The series of continuous bands $A^3$ run over the guide roll $l$ and beneath the similar roll $m$, whereby all the bands are immersed in the coating composition of the tank. After the coating is applied the bands are conducted upwardly through a heating chamber P, the same being equipped with gas burners $p$ or any suitable devices for maintaining a desired temperature within the chamber, whereby the coating applied to the bands is dried or baked upon the metal. The bands $A^3$ run upwardly through the chamber, over an overhead guide pulley $q$ and thence downwardly beneath a guide pulley $q'$ positioned within a compartment of the heating chamber, one side of said chamber being shown as having an opening $q^2$ through which runs the series of bands. Said bands are finally conducted to a coiling mechanism Q, the same consisting, preferably, of independent reels mounted on a shaft $r$, whereby the several bands are wound into compact bundles suitable for industrial or commercial purposes.

It is thought that the operation and advantages of the invention will be readily understood and appreciated by those skilled in the art from the foregoing description taken in connection with the drawings.

Having thus fully described the invention, what I claim as new and desire to secure by Letters Patent is:

1. The process of welding metallic sheets to form a continuous sheet, consisting in sand blasting both sides of the edges of the sheets, lapping the edges of the two sheets, pressing the lapped edges and passing a current through the sand blasted portions of the sheets to continuously weld the lapped portions.

2. The process of welding metallic sheets to form a continuous band, consisting in sand blasting both sides of the edges of the sheets, lapping the edges of the two sheets, pressing the lapped edges and passing a current through the sand blasted portions of the sheets to continuously weld the lapped edges, and cutting the welded sheets into narrow strips.

3. In the art of electrically welding sheet metal, the process which consists in lapping the marginal portions of the metal to be welded, passing an electric current through said lapped margins and concurrently therewith subjecting said lapped margins to rolling pressure for continuously welding said margins and reducing the cross sectional thickness of the resulting weld substantially to the thickness of the sheet.

4. In the art of electrically welding sheet metal, the process which consists in lapping the marginal portions of the metal to be welded, passing an electric current through said lapped marginal portions for softening the same by electric heat, and concurrently therewith imparting a traversing movement to a roller electrode for applying pressure to weld the lapped margins continuously and for rolling the seam to the cross sectional thickness substantially of the sheet metal.

5. In the art of electrically welding sheet metal, the process which consists in lapping the marginal portions of the metal to be welded, heating said lapped marginal portions by passing an electric current therethrough and concurrently with said heating, rolling the lapped margins for continuously welding the same and reducing the cross sectional thickness of said continuous seam weld to approximately the thickness of the sheet metal.

In testimony whereof I have hereunto subscribed my name this 26th day of October, 1920.

SPENCER C. CARY.